(12) United States Patent
Halliday et al.

(10) Patent No.: US 7,977,281 B2
(45) Date of Patent: Jul. 12, 2011

(54) METHODS FOR MINIMIZING THE AMOUNT OF GRAPHITE PARTICLES USED DURING DRILLING OPERATIONS

(75) Inventors: William S. Halliday, Evergreen, CO (US); David W. Schwertner, The Woodlands, TX (US); S. Dwight Strickland, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 120 days.

(21) Appl. No.: 12/415,282

(22) Filed: Mar. 31, 2009

(65) Prior Publication Data

US 2009/0258800 A1 Oct. 15, 2009

Related U.S. Application Data

(63) Continuation-in-part of application No. 11/314,671, filed on Dec. 21, 2005, which is a continuation-in-part of application No. 10/818,591, filed on Apr. 6, 2004, now Pat. No. 7,087,555.

(60) Provisional application No. 60/460,939, filed on Apr. 7, 2003.

(51) Int. Cl.
*C09K 8/00* (2006.01)
*E21B 43/00* (2006.01)

(52) U.S. Cl. .......................................... 507/140

(58) Field of Classification Search .................. None
See application file for complete search history.

(56) References Cited

U.S. PATENT DOCUMENTS

| | | | | |
|---|---|---|---|---|
| 4,160,813 | A | * | 7/1979 | Markel et al. .................. 423/448 |
| 5,401,719 | A | * | 3/1995 | DeBeer .......................... 507/127 |
| 5,605,872 | A | | 2/1997 | Engel et al. |
| 5,826,669 | A | * | 10/1998 | Zaleski et al. ................... 175/72 |
| 5,837,655 | A | | 11/1998 | Halliday et al. |
| 5,851,958 | A | | 12/1998 | Halliday et al. |
| 5,942,467 | A | | 8/1999 | Rayborn, Sr. et al. |
| 5,969,001 | A | | 10/1999 | Kawai |
| 6,290,001 | B1 | | 9/2001 | West et al. |
| 6,632,527 | B1 | | 10/2003 | McDaniel et al. |
| 6,750,179 | B1 | | 6/2004 | Burts, Jr. |
| 7,087,555 | B2 | | 8/2006 | Halliday et al. |
| 2002/0048676 | A1 | | 4/2002 | McDaniel et al. |
| 2003/0132000 | A1 | | 7/2003 | Shaarpour |
| 2004/0106525 | A1* | | 6/2004 | Willberg et al. ............. 507/200 |
| 2004/0224852 | A1 | | 11/2004 | Halliday et al. |

(Continued)

FOREIGN PATENT DOCUMENTS

WO 02/22759 A 3/2002

(Continued)

OTHER PUBLICATIONS

Conversion of MESH to aperture (mm), VWR Chromatography, http://www.chromatography.co.uk/TECHNIQS/Other/Mesh.htm, 2000, '01, '02.

(Continued)

*Primary Examiner* — John J Figueroa
(74) *Attorney, Agent, or Firm* — The Morris Law Firm, P.C.; Paula Morris (57) ABSTRACT

Methods for minimizing the amount of graphite particles used during drilling operations, the methods comprise performing drilling operations using a drilling fluid system having effective rheological and fluid loss control properties, the drilling fluid system comprising a mixture of graphite particles having an effective particle size distribution.

12 Claims, 3 Drawing Sheets

Particle Size Distrubution

U.S. PATENT DOCUMENTS

2006/0122070 A1    6/2006    Halliday et al.

FOREIGN PATENT DOCUMENTS

WO        WO 0222759 A1 *    3/2002

OTHER PUBLICATIONS

PCT, International Search Report and Written Opinion of the International Searching Authority for Patent Application No. PCT/US2004/010650 dated Oct. 13, 2004.
The Morris Law Firm, P.C., Amendments for Patent Application No. PCT/US2004/010650 dated Dec. 2, 2004.
PCT, Written Opinion of the International Preliminary Examining Authority for Patent Application No. PCT/US2004/010650 dated Apr. 14, 2005.
The Morris Law Firm, P.C., Amendments for Patent Application No. PCT/US2004/010650 dated May 31, 2005.
PCT, International Preliminary Report on Patentability for Patent Application No. PCT/US2004/010650 dated Jul. 20, 2005.
USPTO, First Office Action for U.S. Appl. No. 10/818,591 dated Nov. 14, 2005.
The Morris Law Firm, P.C., Response to First Office Action for U.S. Appl. No. 10/818,591 dated Feb. 21, 2006.
European Patent Office, Communication Pursuant to Article 96(2) EPC for Patent Application No. 04749826.6-2111 dated Jan. 18, 2007.
Patent Office of the Copperation Council for the Arab States of the Gulf, Examination Report for Patent Application No. GCC/P/2004/3783 dated Apr. 18, 2007.
Frank B. Dehn & Co., Reply to Communication for European Patent Application No. 04749826.6-2111 dated Aug. 24, 2007.
The Morris Law Firm, P.C., Preliminary Amendment for U.S. Appl. No. 11/314,671 dated Oct. 19, 2007.
European Patent Office, Communication pursuant to Article 94(3) EPC for Patent Application No. 07022291.4-2111 dated Aug. 20, 2008.
Frank B. Dehn & Co., Reply to EPO Communication for European Patent Application No. 04749826.6-2111 dated Dec. 17, 2008.
USPTO, First Office Action for U.S. Appl. No. 11/314,671 dated Dec. 24, 2008.
The Morris Law Firm, P.C., Response to First Office Action for U.S. Appl. No. 11/314,671 dated Feb. 16, 2009.
USPTO, Final Office Action for U.S. Appl. No. 11/314,671 dated May 22, 2009.
The Morris Law Firm, P.C., Response to Final Office Action for U.S. Appl. No. 11/314,671 dated Jul. 20, 2009.
USPTO, Advisory Action for U.S. Appl. No. 11/314,671 dated Aug. 4, 2009.

* cited by examiner

METHODS FOR MINIMIZING THE AMOUNT OF GRAPHITE PARTICLES USED DURING DRILLING OPERATIONS

CROSS REFERENCE TO RELATED-APPLICATIONS

The present application is a continuation-in-part of U.S. patent application Ser. No. 11/314,671, filed Dec. 21, 2005, which is a continuation-in-part of application Ser. No.; 10/818,591, filed Apr. 6, 2004, which issued as U.S. Pat. No. 7,087,555 on Aug. 8, 2006, which claims the benefit of U.S. Provisional Application Ser. No. 60/460,939 filed Apr. 7, 2003.

FIELD OF THE APPLICATION

The present application relates to methods for minimizing the amount of graphite particles used during drilling operations.

BACKGROUND OF THE APPLICATION

Graphite particles are useful in drilling fluid systems as an alternative mechanical lubricant to glass and/or plastic beads to reduce torque and drag on the drilling assembly. Unfortunately, the particle size distribution of commercially available graphites is either too large or too small for optimum use in most drilling fluid systems.

BRIEF SUMMARY

The present application provides a method for minimizing the amount of graphite used during drilling operations, the method comprising performing drilling operations using a drilling fluid system having effective Theological and fluid loss control properties, the drilling fluid system comprising a mixture of graphite particles having a particle size distribution effective to permit from about 65 to about 80 wt. % of the graphite particles to pass through a shaker screen having a mesh size of about 177 microns (80 mesh) or smaller during said drilling operations.

In one embodiment, the application provides a method for minimizing the amount of graphite used during drilling operations, the method comprising performing drilling operations using a drilling fluid system having effective rheological and fluid loss control properties; the drilling fluid system comprising from about 5 lb/bbl to about 10 lb/bbl of a mixture of graphite particles having a particle size distribution effective to permit from about 65 to about 80 wt. % of the graphite particles to pass through a shaker screen having a mesh size of about 177 microns (86D mesh) or smaller during said drilling operations.

In one embodiment, the application provides a method for minimizing the amount of graphite used during drilling operations, the method comprising performing drilling operations using a drilling fluid system having effective rheological and fluid loss control properties, the drilling fluid system comprising from about 5 lb/bbl to about 10 lb/bbl of a mixture of graphite particles, wherein 82 wt. % or more of the graphite particles have a particle size of 177 microns (60 mesh) or smaller.

DETAILED DESCRIPTION

The present application relates to "drilling fluid systems" useful during drilling operations, including but not necessarily limited to "drilling" fluids, "drill-in" fluids, "completion" fluids, "workover" fluids, and "spotting" fluids.

A "drill-in" fluid is pumped through the drill pipe while drilling through the "payzone," or the zone believed to hold recoverable oil or gas. A "drilling fluid" is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling auld lubricating the bit, carrying the cuttings from the hole to the surface, and exerting a hydrostatic pressure against the borehole wall to prevent the flow of fluids from the surrounding formation into the borehole. A "completion fluid" is used to protect the "payzone" during the completion phase of the well. Specially formulated fluids are used in connection with completion and workover operations to minimize damage to the formation. Workover fluids are used during remedial work in the well, such as removing tubing, replacing a pump, logging, reperforating, and cleaning out sand or other deposits. Spotting fluids are pumped downhole intermittently for various purposes. Cementing fluids are used to cement the well liner in place.

Synthetic graphite particles are commercially available. However, the particle size distribution of commercially available graphites is too large to be optimally effective in most drilling fluid systems, particularly drilling fluids, and too small to be optimally effective, for example, in spotting fluids or pills used to facilitate casing or liner runs.

Before recirculation to a wellbore, a drilling fluid typically passes through a high speed shaker to remove solids. The particle size distribution of currently available graphite particle mixtures results in much of the graphite being removed from the drilling fluid as the drilling fluid passes through the high speed shakers.

On the other hand, where the fluid is intended to pass through the system only once, as with a spotting fluid or a spotting pill, and during casing and liner runs, it is advantageous for the graphite particles to be as large as possible in order to achieve optimum mechanical lubrication.

The present application provides graphite mixtures having a particle size distribution effective for use in drilling fluid systems. The application also provides graphite particle mixtures having a particle size distribution effective for use in spotting fluids. The application provides methods for using the graphite particle mixtures and drilling fluid systems comprising the graphite particle mixtures.

Drilling Fluid Systems

The present application minimizes the amount of graphite particles that must be added during drilling operations to maintain effective lubricity in a drilling fluid system. This is accomplished by providing a drilling fluid system comprising as an integral part a graphite particle mixture having a particle size distribution comprising (a) at least some particles sufficiently large not to pass through a high speed shaker screen during drilling operations, while (b) a majority of the particles have a particle size sufficiently small to pass thorough the high speed shaker screen.

High speed shakers used during drilling operations typically have a screen with a mesh size of from about 177 microns (80 mesh) to about 74 microns (200 mesh). In one embodiment, the graphite particle mixture used in the drilling fluid system comprises a sufficient amount of relatively large graphite particles to reduce torque and drag on the drill bit, but the particles are also small enough that greater than 65 wt. % of the graphite particles pass through the high speed shaker screen. Suitably, about 80 wt. % or more of the graphite particles pass through the shaker screen. The higher the number in the range of from 65 wt. % and about 80 wt. %, the more suitable the number. For example, 67 wt. % or more is more suitable than 66 wt. % or more, etc. In one embodiment, 80 wt. % or more of the graphite particles pass through the high speed shaker screen.

In other words, the drilling fluid system comprises at least some graphite particles having a particle size of 177 microns or larger. In one embodiment, the drilling fluid system comprises at least some graphite particles having a particle size of larger than 177 microns. In one embodiment, the drilling fluid system comprises about 20 wt. % or more of the graphite particles having a particle size of 177 microns or larger. Suitably, about 35 wt. % or less of the graphite particles have a particle size of 177 microns or larger. In one embodiment, the drilling fluid system comprises about 20 wt. % or more of the graphite particles having a particle size of larger than 177 microns. Suitably, about 35 wt. % or less of the graphite particles have a particle size of larger than 177 microns.

In one graphite particle mixture for drilling fluid systems, the quantity of graphite particles having a particle size of 250 microns or smaller (60 mesh or less), suitably smaller than 250 microns (smaller than 60 mesh), is 82 wt. % or more. In one embodiment, the quantity of graphite particles having a particle size of 250 microns or smaller (60 mesh or less), suitably smaller than 250 microns (smaller than 60 mesh), is about 90 wt. % or more. A suitable graphite mixture for drilling fluid systems comprises 90 wt. % or more of graphite particles having a particle size of 250 microns or smaller (60 mesh or smaller), suitably smaller than 250 microns (smaller than 60 mesh).

In one graphite particle mixture for drilling fluid-systems, the quantity of graphite particles having a particle size of 125 microns or smaller (120 mesh or smaller) is about 25 wt. % or more, suitably about 30 wt. % or more, more suitably about 35 wt. % or more, even more suitably 40 wt. % or more, even more suitably 45 wt. % or more, and even more suitably 50 wt. % or more. One graphite mixture for drilling fluid systems comprises greater than 50 wt. %, suitably about 90 wt. % or more of graphite particles having a particle size of 125 microns or smaller (120 mesh or smaller).

In one embodiment, the drilling fluid system comprises a graphite particle mixture comprising about 82 wt. % or more graphite particles having a particle size of 250 microns or smaller (60 mesh or smaller), suitably smaller than 250 microns (less than 60 mesh), and 25 wt. % or more, suitably 35 wt. % or more, even more suitably 40 wt. % or more, even more suitably 45 wt. % or more, and even more suitably 50 wt. % or more graphite particles having a particle size of 125 microns or smaller (120 mesh or smaller). In another embodiment, the drilling fluid system comprises a graphite particle mixture comprising about 90 wt. % or more graphite particles having a particle size of 250 s microns or smaller (60 mesh or smaller), suitably smaller than 250 microns (smaller than 60 mesh), and 50 wt. % or more graphite particles having a particle size of 125 microns or smaller (120 mesh or smaller).

Generally, the quantity of graphite material used in a drilling fluid system is from about 11.4 kg/m$^3$ (4 lb/bbl) to about 28.5 kg/m$^3$ (10 lb/bbl), suitably from about 14.25 kg/m$^3$ (5 lb/bbl) to about 22.8 kg/m$^3$ (8 lb/bbl).

Formation damage can result when solids and/or filtrate derived from a drilling fluid system invades the formation during drilling operations. Graphite particles have the advantage that the particles tend to act as bridging agents and serve as a lost circulation material.

Spotting Fluid

Greater mechanical lubricity is provided as the size of the graphite particles increases. Because of this, when a fluid is not designed for continuous recirculation, it is suitable to use relatively larger graphite particles. Drilling fluid systems which are not designed for continuous recirculation include, but are not necessarily limited to fluids for casing runs, lining runs, and spotting pills used for a variety of purposes, including use in a drilling mode to relieve torque and drag. Fluids which are not designed for continuous recirculation are hereafter collectively referred to as "spotting fluids."

Although the size of the graphite particles used in spotting fluids may be relatively larger, the graphite particles still must be sufficiently small to be suspended in the spotting fluid and transported through the wellbore to the treatment site. A graphite particle mixture suitable for use in a spotting fluid has an average particle size of about 841 microns (20 mesh) or smaller, suitably 420 microns (40 mesh) or smaller. A graphite particle mixture suitable for use in a spotting fluid also has an average particle size of up to 125 microns (120 mesh) or larger, suitably larger than 125 microns (120 mesh). In one embodiment, the graphite particles have an average particle size of from about 841 microns (20 mesh) to about 420 microns (40 mesh).

Generally, the quantity of graphite material used in a spotting fluid is from about 28.5 kg/m$^3$ (10 lb/bbl) to about 140 kg/m$^3$ (50 lb/bbl), suitably from about 57 kg/m$^3$ (20 lb/bbl) to about 114 kg/m$^3$ (40 lb/bbl).

The graphite particles used in a drilling fluid system may have a variety of morphologies, including but not necessarily limited to spherical, ellipsoid, conical, cylindrical, cubical, trapezoidal, etc. In one embodiment, the graphite particles have rounded outer surfaces. Suitable morphologies include, for example, spherical or ellipsoidal. In one embodiment, the graphite particles are spherical. Graphite particles that may be screened or otherwise separated by size to result in the combinations described herein are commercially available from Superior Graphite Co.

The drilling fluid system in which the graphite particles are used may be water-based or oil-based. The phrase "water-based" includes any drilling fluid system comprising water or a water-based solution as the continuous phase, including oil-in-water and oil-in-brine emulsions. The drilling fluid systems of the present application also may be oil based. The phrase "oil-based" includes fluids comprising an organic material as a continuous phase, including water-in-oil and brine-in-oil emulsions, also sometimes called "invert emulsions."

Examples of suitable organic materials for the "oil" of such fluids include but are not necessarily limited to olefins, paraffins, water insoluble polyglycols, water insoluble esters, diesel, water insoluble Fischer-Tropsch reaction products, and other organic materials, suitably materials that are non-toxic at the concentrations used, and combinations thereof. Suitable olefins are branched and/or linear and suitably are relatively non-toxic synthetic olefins. Examples of suitable olefins include but are not necessarily limited to polyalpha-olefins, linear alpha olefins, and internal olefins, typically skeletally isomerized olefins. In one embodiment, the olefins are described in U.S. Pat. Nos. 5,605,872 and 5,851,958, incorporated herein by reference. Suitable paraffins are described in U.S. Pat. No. 5,837,655, incorporated herein by reference.

The "oil" and other components used in the drilling fluid system suitably are non-toxic. As used herein, the term "non-toxic" is defined to mean that a material meets the applicable EPA, requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. Suitable drilling fluid systems meet relevant environmental standards in the location of the operation.

In order to be effective for use during drilling operations, the particular drilling fluid system must have effective rheology and lubricity properties, and for near balanced and overbalanced drilling, effective fluid loss control properties. Viscosity suitably is controlled by adding certain polymers to the fluid. The drilling fluid system suitably contains polymers that are capable of viscosifying the drilling fluid system and/or providing filtration control for the drilling fluid system. Suitable polymers are non-toxic and will depend upon the base fluid. Suitable polymers include, but are not necessarily limited to water soluble starches and modified versions thereof, water soluble polysaccharides and modified versions thereof, water soluble celluloses and modified versions thereof, and water soluble polyacrylamides and copolymers thereof. Generally, the quantity of polymer used is at least about 2.85 kg/m³ (1 lb/bbl.) or more, suitably about 19.95 kg/m³ (7 lb/bbl.) or more.

Starches that are suitable for use in the drilling fluid systems include, but are not necessarily limited to corn based and potato based starches, suitable starches being more temperature stable starches. Polysaccharides that are suitable for use in the drilling fluid systems include, but are not necessarily limited to xanthan polysaccharides, wellan polysaccharides, scleroglucan polysaccharides, and guar polysaccharides. Celluloses that are suitable for use in the drilling fluid systems include, but are not necessarily limited to hydrophobically modified hydroxyethyl celluloses and cationic cellulose ethers. Suitable copolymers of acrylamide include copolymers with acrylate monomers, hydrophobic N-isopropylacrylamide, and the like.

As used herein, the terms "modified starches" and "modified polysaccharides" or "synthetically modified polysaccharides" refer to starches and polysaccharides that have been chemically modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311-388 (Roy L. Whistler, et al. eds., 1984), incorporated herein by reference.

Specific examples of suitable modified starches and modified polysaccharides include, but are not necessarily limited to: caorboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, is other starch and polysaccharide copolymers having similar characteristics. Suitable modified starches and/or modified polysaccharides comprise a functional group selected from the group consisting of a carboxymethyl group, a propylene glycol group, and an epichlorohydrin group.

Where the fluid is water-based, suitable viscosifiers and filtration control agents include, for example, biopolymers, including but not necessarily limited to XAN-PLEX™ D, BIO-PAQ™ and/or BIOLOSE™, all of which are commercially available from Baker Hughes INTEQ.

Where the fluid is oil-base, suitable viscosifiers include, for example, organophilic clays and suitable filtration control agents include, for example, asphaltic and lignitic materials.

The viscosity of a fluid is its internal resistance to flow as measured in centipoise units. The coefficient of viscosity of a normal homogeneous fluid at a given temperature and pressure is a constant for that fluid and independent of the rate of shear or the velocity gradient. Fluids that obey this rule are "Newtonian" fluids. In fluids called "non-Newtonian fluids," this coefficient is not constant but is a function of the rate at which the fluid is sheared as well as of the relative concentration of the phases. Drilling fluids generally are non-Newtonian fluids. Non-Newtonian fluids frequently exhibit plastic flow, in which the flowing behavior of the material occurs after the applied stress reaches a critical value or yield point (YP). Yield points in drilling fluids are frequently expressed in units of Pascals or pounds per square 100 feet, wherein the yield point is a function of the internal structure of the fluid.

In drilling, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids and is similarly measured in centipoise units. In drilling fluids, yield points (YP) above a minimum value are desirable to adequately suspend solids, such as weighting agents and cuttings. A drilling fluid system suitably has a yield point of from about 9.6 to about 24 Pascals (from about 20 to about 50 pounds per 100 square feet), suitably about 14.4 Pascals or more (about 30 or more pounds per 100 square feet). A spotting fluid suitably has a yield point of from about 4.8 to about 24 Pascals (from about 10 to about 50 pounds per 100 square feet).

Conventional additives may be used in the fluid. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides; one or more bridging and/or weighting agents may be added to the fluid, and combinations thereof. Suitable shale stabilizers include, but are not necessarily limited to polyglycols, inorganic salts, chelates, amines, alkanolamines, alkanolamides, amphoteric compounds, alone or in aqueous solutions, and mixtures thereof. Suitable shale stabilizing inorganic salts include, but are not necessarily limited to alkali metal salts, silicate salts, and aluminum salts. Acids include acids used to treat cement contamination.

Suitable systems for use with the graphite particles include, but are not necessarily limited to NEW-DRILL, CLAY-TROL, AQUA-DRILL, SYN-TEQ, CARBO-DRILL®, and UNI-CAL, which are commercially available from Baker Hughes INTEQ, Houston, Tex.

The fluid is prepared using conventional procedures. Generally in water based fluids, the pH of the fluid is measured and, if needed, adjusted to from about 8.5 to about 11.5, suitably about 9.5. The pH may be adjusted using a suitable organic base as a buffer. Substantially any buffer may be used. Suitable buffers include, but are not necessarily limited to ethanolamines (suitably triethanolamines), alkali metal hydroxides, suitably sodium or potassium hydroxide, alkali metal acetates, suitably sodium or potassium acetate. In one embodiment, the buffers are alkali metal oxides, for example, magnesium oxide.

The application will be better understood with reference to the following Examples:

Example 1

A sample of synthetic spherical graphite (GLIDEGRAPH 7001) was obtained from Superior Graphite Co. to assess the particle size. The product specification for GLIDEGRAPH-7001, available from Superior Graphite Co., states under "Typical Properties" that the particle size is "85% within 70 & 200-Mesh. +99% greater than 200 mesh," or 85% within 210 microns & 74 microns +99% greater than 74 microns.

Figure 1:
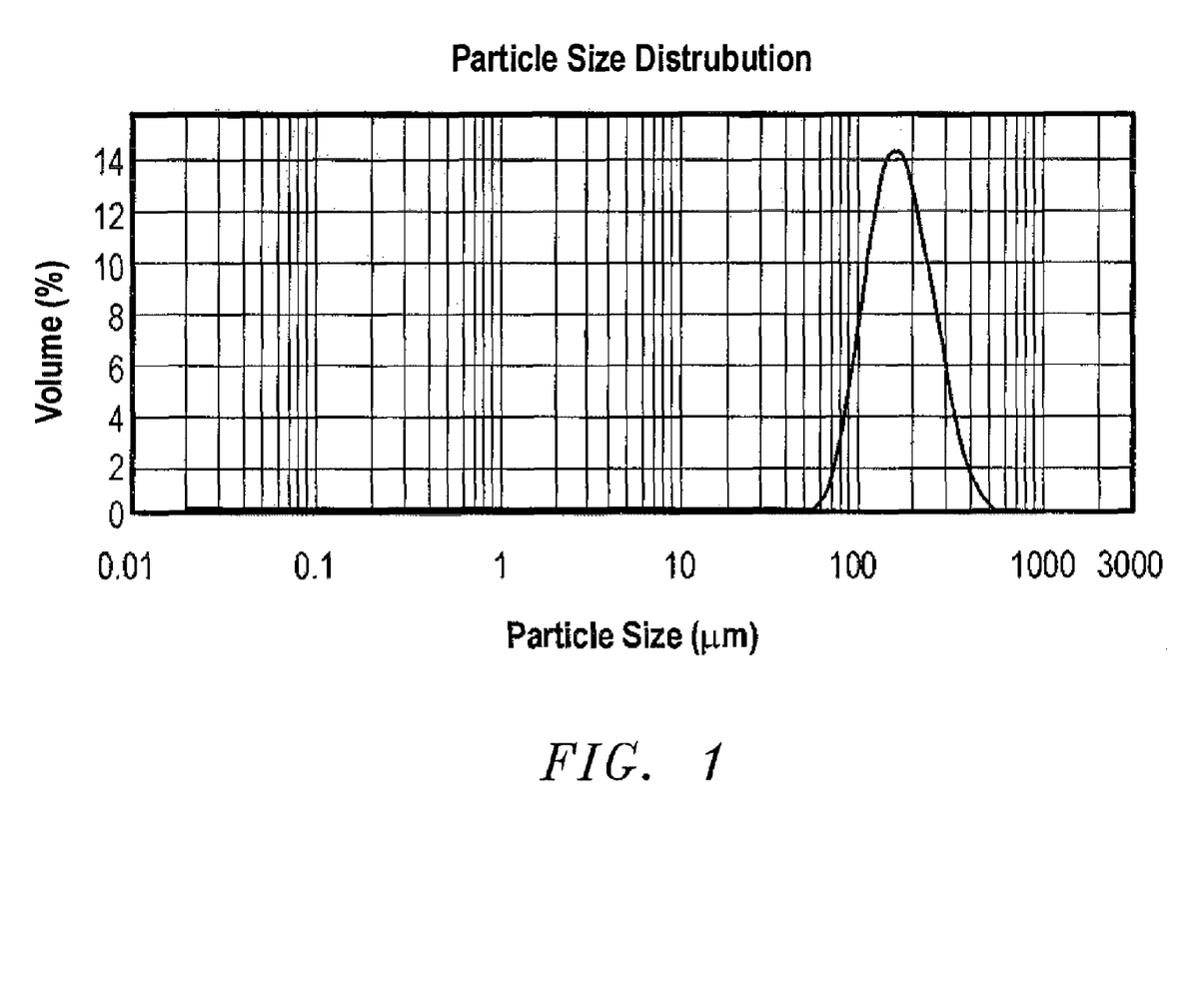
FIG. 1 is a graph of the particle size distribution of the sample in Example 1.

Two tests were run to quantify spherical particle size of the sample. In a first test, an eluent of 80 ml deionized water solution containing 5 g sodium citrate was tested using the Malvern Mastersizer 2000 Laser Instrument. A standard was created, using a refractive index of 2.42. The ultrasonic option was used to assist the graphite sample in dispersion. The particle size distribution was from about 500 microns (35 mesh) to about 74 microns (200 mesh), as illustrated in FIG. 1, and given in the following Table:

| Parameter | Vol. below % |
| --- | --- |
| 500 microns (35 Mesh) | 99.93 |
| 420 microns (40 Mesh) | 99.01 |
| 354 microns (45 Mesh) | 96.38 |
| 297 microns (50 Mesh) | 90.80 |
| 250 microns (60 Mesh) | 81.74 |
| 210 microns (70 Mesh) | 68.91 |
| 177 microns (80 Mesh) | 53.73 |
| 149 microns (100 Mesh) | 37.69 |
| 125 microns (120 Mesh) | 22.87 |
| 105 microns (140 Mesh) | 11.54 |
| 88 microns (170 Mesh) | 4.31 |
| 74 microns (200 Mesh) | 0.93 |

The graphite sample also was tested using U.S.A. standard testing sieves and a Ro-Tap shaker. Each sieve was weighed prior to adding the sample for tare weight. After the sieves were assembled, with the smaller mesh number on top and increasing downward, a 50 g sample of the GLIDE GRAPH 7001 was placed on the top sieve. The following were the results:

| Parameter | Wt. % Through |
| --- | --- |
| 500 microns (30 Mesh) | 100.0 |
| 420 microns (40 Mesh) | 99.18 |
| 250 microns (60 Mesh) | 87.84 |
| 177 microns (80 Mesh) | 65.00 |
| 149 microns (100 Mesh) | 48.18 |
| 125 microns (120 Mesh) | 28.22 |
| 105 microns (140 Mesh) | 15.76 |
| 74 microns (200 Mesh) | 0.4 |

Example 2

Figure 2:
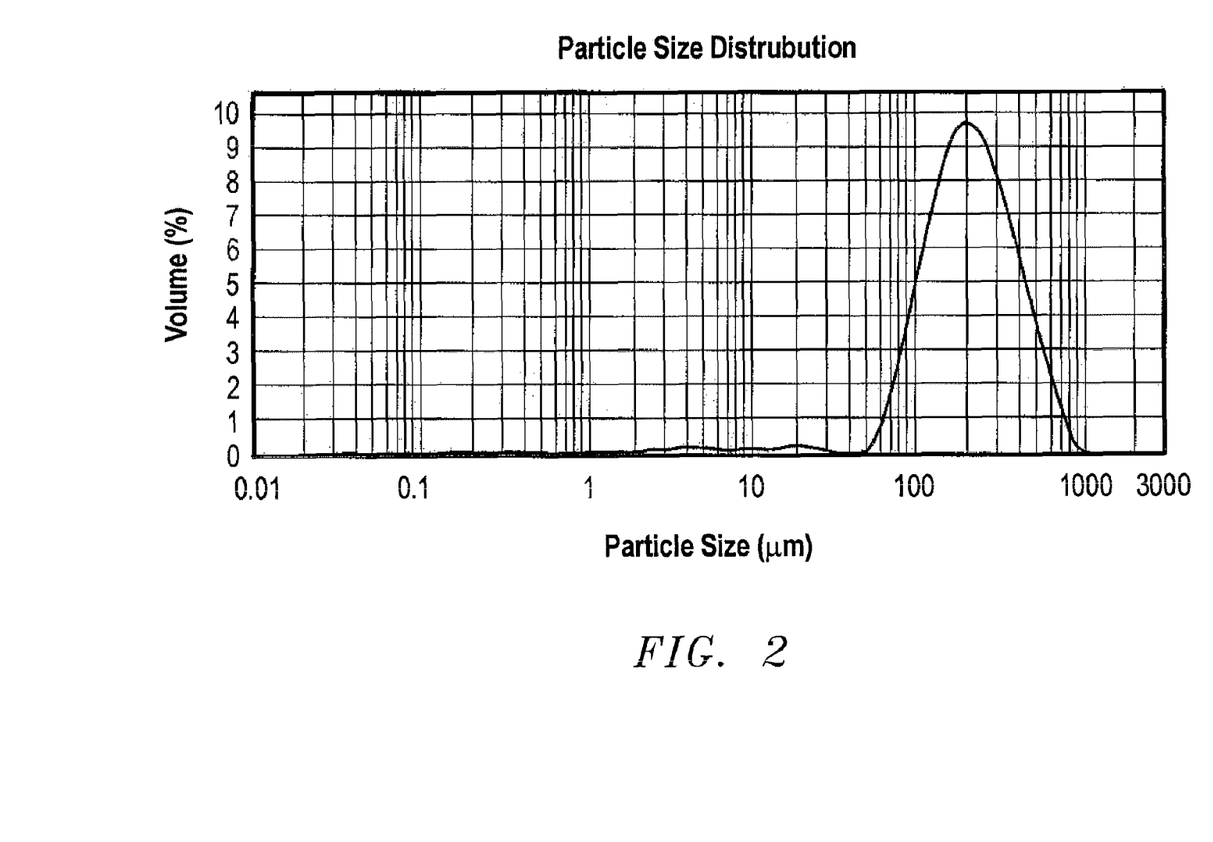
FIG. 2 is a graph of the particle size distribution of the "coarse" fraction of the sample in Example 2.

50 g of GLIDEGRAPH 7001 were split into a "coarse" fraction and a "fine" fraction using a 74 micron (200 mesh) screen. The particle size distribution of each sample was measured using a Malvern Mastersizer 2000. The particles in the coarse fraction generally were from about 841 microns (20 mesh) to about 53 microns (270 mesh), with a majority of the particles being greater than 210 microns (70 mesh) (100 vol. %-49.85 vol. %=50.15 vol. %). Only about 39.23 vol. % (100 vol. %-60.77 vol. %) of the particles were 250 microns (60 mesh) or larger. About 19.92 vol. % of the particles in the "coarse" fraction had a particle size of 125 microns (120 mesh) or less. FIG. 2 is a graph of the particle size distribution for the "coarse" fraction. The following Table gives the corresponding data related to the mesh sizes of the particles depicted in FIG. 2:

| Microns (Mesh No.) | Vol. Below % |
| --- | --- |
| 1680 microns (12 mesh) | 100.00 |
| 1410 microns (14 mesh) | 100.00 |
| 1190 microns (16 mesh) | 100.00 |
| 1000 microns (18 mesh) | 100.00 |
| 841 microns (20 mesh) | 99.82 |
| 707 microns (25 mesh) | 98.79 |
| 595 microns (30 mesh) | 98.53 |
| 500 microns (35 mesh) | 92.68 |
| 420 microns (40 mesh) | 87.08 |
| 354 microns (45 mesh) | 79.86 |
| 297 microns (50 mesh) | 70.85 |
| 250 microns (60 mesh) | 60.77 |
| 210 microns (70 mesh) | 49.85 |
| 177 microns (80 mesh) | 39.10 |
| 149 microns (100 mesh) | 28.92 |
| 125 microns (120 mesh) | 19.92 |
| 105 microns (140 mesh) | 12.86 |
| 88 microns (170 mesh) | 7.83 |
| 74 microns (200 mesh) | 4.84 |
| 63 microns (230 mesh) | 3.44 |
| 53 microns (270 mesh) | 2.91 |
| 44 microns (325 mesh) | 2.91 |
| 37 microns (400 mesh) | 2.91 |

Figure 3:
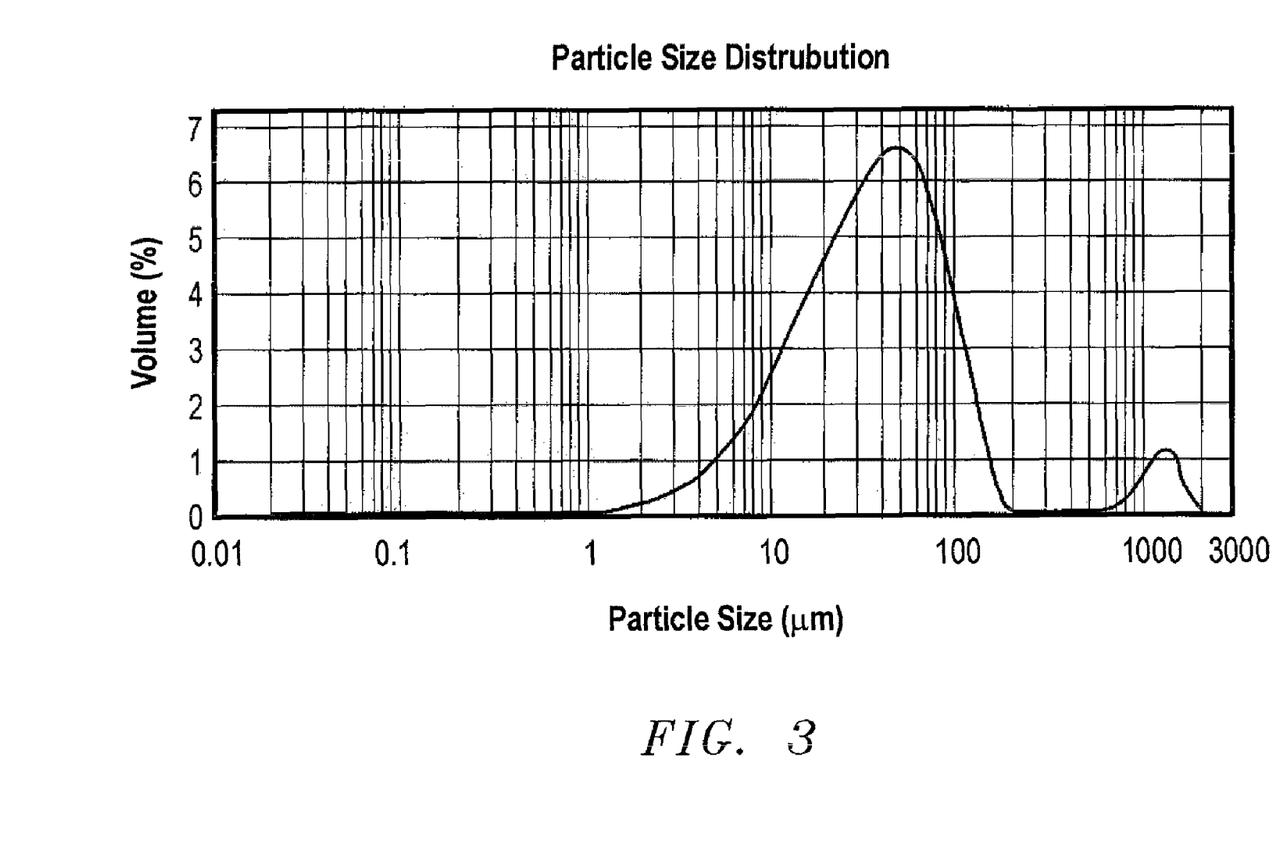
FIG. 3 is a graph of the particle size distribution of the "fine" fraction of the sample from Example 2.

The particles in the fine fraction had a particle size of from about 1680 microns (12 mesh) to about 15 microns (1100 mesh), with about 92.6 vol. % having particle size of smaller than 125 microns (smaller than 120 mesh), and 95.51 vol. % having a particle size of smaller than 250 microns (smaller than about 60 mesh). FIG. 3 is a graph of the particle size distribution of the "fine" fraction. The following Table gives the corresponding data related to the mesh sizes of the particles depicted in FIG. 2:

| Mesh No. | Vol. Below % |
| --- | --- |
| 2000 microns (10 mesh) | 100.00 |
| 1680 microns (12 mesh) | 99.74 |
| 1410 microns (14 mesh) | 98.75 |
| 1000 microns (18 mesh) | 97.48 |
| 841 microns (20 mesh) | 96.43 |

-continued

| Mesh No. | Vol. Below % |
| --- | --- |
| 707 microns (25 mesh) | 95.84 |
| 595 microns (30 mesh) | 95.60 |
| 500 microns (35 mesh) | 95.53 |
| 420 microns (40 mesh) | 95.51 |
| 354 microns (45 mesh) | 95.51 |
| 297 microns (50 mesh) | 95.51 |
| 250 microns (60 mesh) | 95.51 |
| 210 microns (70 mesh) | 95.51 |
| 177 microns (80 mesh) | 95.43 |
| 149 microns (100 mesh) | 94.61 |
| 125 microns (120 mesh) | 92.60 |
| 105 microns (140 mesh) | 89.18 |
| 88 microns (170 mesh) | 84.27 |
| 74 microns (200 mesh) | 78.21 |
| 63 microns (230 mesh) | 71.81 |
| 53 microns (270 mesh) | 64.49 |
| 44 microns (325 mesh) | 56.51 |
| 37 microns (400 mesh) | 49.30 |

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A method for minimizing the amount of graphite particles used during drilling operations, the method comprising repeatedly circulating a drilling fluid system having effective rheological and fluid loss control properties, the drilling fluid system comprising from about 5 lb/bbl to about 10 lb/bbl of a mixture of graphite particles having a particle size distribution effective to retain from about 20 to 35 wt. % of the graphite particles on a shaker screen having a mesh size of about 177 microns or smaller (80 mesh or more) and to permit from about 65 to about 80 wt. % of the graphite particles to pass through the shaker screen during said drilling operations.

2. The method of claim 1 wherein 82 wt. % or more of the graphite particles have a particle size of 250 microns or smaller (60 mesh or more).

3. The method of claim 2 wherein 35 wt. % or more of the graphite particles have a particle size of 125 microns or smaller (120 mesh or more).

4. The method of claim 2 wherein 50 wt. % or more of the graphite particles have a particle size of 125 microns or smaller (120 mesh or more).

5. The method of claim 1 wherein 90 wt. % or more of the graphite particles having a particle size of 250 microns or smaller (60 mesh or more).

6. The method of claim 1 wherein 82 wt. % or more of the graphite particles have a particle size of smaller than 250 microns (more than 60 mesh).

7. The method of claim 1 wherein 90 wt. % or more of the graphite particles have a particle size of smaller than 250 microns (more than 60 mesh).

8. The method of claim 1 wherein 35 wt. % or more of the graphite particles have a particle size of 125 microns or smaller (120 mesh or more).

9. The method of claim 1 wherein 50 wt. % or more of the graphite particles have a particle size of 125 microns or smaller (120 mesh or more).

10. The method of claim 1 wherein the drilling fluid system comprises from about 5 lb/bbl to about 8 lb/bbl of the mixture of graphite particles.

11. A method for minimizing the amount of graphite particles used during drilling operations, the method comprising repeatedly circulating during drilling operations a drilling fluid system having effective rheological and fluid loss control properties, the drilling fluid system comprising from about 5 lb/bbl to about 10 lb/bbl of a mixture of graphite particles, wherein 82 wt. % or more of the graphite particles have a particle size of 177 microns or smaller (60 mesh or more) and 18 wt. % or more of the graphite particles have a particle size of 177 microns or larger (80 mesh or less).

12. The method of claim 11 wherein the drilling fluid system comprises from about 5 lb/bbl to about 8 lb/bbl of the mixture of graphite particles.

* * * * *

UNITED STATES PATENT AND TRADEMARK OFFICE
CERTIFICATE OF CORRECTION

| | | |
|---|---|---|
| PATENT NO. | : 7,977,281 B2 | |
| APPLICATION NO. | : 12/415282 | |
| DATED | : July 12, 2011 | |
| INVENTOR(S) | : William S. Halliday, David W. Schwertner and S. Dwight Strickland | |

It is certified that error appears in the above-identified patent and that said Letters Patent is hereby corrected as shown below:

Col. 10, line 8; Claim 5, please delete the word "having" and insert therefor the word --have--.

Signed and Sealed this
Sixth Day of September, 2011

David J. Kappos
*Director of the United States Patent and Trademark Office*